United States Patent [19]
Zhong et al.

[11] Patent Number: 5,631,104
[45] Date of Patent: May 20, 1997

[54] HIGH VOLTAGE INSERTION COMPOUNDS FOR LITHIUM BATTERIES

[75] Inventors: Qiming Zhong, Coquitlam; Arman Bonakdarpour, North Vancouver, both of Canada

[73] Assignee: Moli Energy (1990) Limited, Canada

[21] Appl. No.: 583,974

[22] Filed: Jan. 11, 1996

[30] Foreign Application Priority Data

Sep. 13, 1995 [CA] Canada ................... 2158242

[51] Int. Cl.$^6$ .......................... H01M 4/50; H01M 10/40; C01G 45/12
[52] U.S. Cl. .................. 429/194; 429/223; 429/224; 423/594; 423/599
[58] Field of Search .................... 429/194, 223, 429/224, 221, 218; 423/594, 595, 596, 599

[56] References Cited

U.S. PATENT DOCUMENTS

| | | |
|---|---|---|
| 4,302,518 | 11/1981 | Goodenough et al. |
| 4,423,125 | 12/1983 | Basu . |
| 4,507,371 | 3/1985 | Thackeray et al. |
| 4,702,977 | 10/1987 | Hiratsuka et al. |
| 5,084,366 | 1/1992 | Toyoguchi . |
| 5,192,629 | 3/1993 | Guyomard et al. |
| 5,316,877 | 5/1994 | Thackeray et al. |
| 5,370,948 | 12/1994 | Hasegawa et al. ............ 429/223 |

FOREIGN PATENT DOCUMENTS

| | | |
|---|---|---|
| 2102738 | 11/1993 | Canada . |
| 4-141954 | 5/1992 | Japan . |

OTHER PUBLICATIONS

J.M. Tarascan, et al., The Spinel Phase of $LiMn_2O_4$ as a Cathode in Secondary Lithium Cells, J. Electrochem. Soc., vol. 138, No. 10, Oct. 1991, p. 2859.

Wang Baochen, et al., Studies of spinel $LiCr_xMn_{2-x}O_4$ for secondary lithium battery, Journal of Power Sources, 43–44, (1993) 539–546. (No month).

J.M. Tarascon, $Li_{1+x}Mn_2O_4$: Materials and Electrochemical Aspects, presented at 11th International Seminar on Primary and Secondary Battery Technology and Application, Feb. 28–Mar. 3, 1994, Deerfield Beach, Florida.

C. Sigala, et al., Positive electrode materials with high operating voltage for lithium batteries: $LiCr_yMn_{2-y}O_4$ ($0 \leq y \leq 1$), Solid State Ionics 81 (1995), 167–170. (No month).

*Primary Examiner*—Anthony Skapars
*Attorney, Agent, or Firm*—Lerner, David, Littenberg, Krumholz & Mentlik

[57] ABSTRACT

Insertion compounds having the formula $Li_{x+y}M_zMn_{2-y-z}O_4$ wherein the crystal structure is spinel-like, M is a transition metal, $0 \leq x < 1$, $0 \leq y < 0.33$, and $0 < z <$ about 1, can reversibly insert significant amounts of lithium at potentials greater than about 4.5 volts versus $Li/Li^+$. In particular, M can be Ni or Cr. The reversible amount of lithium at such voltages can be greater for greater values of z. Such insertion compounds are suitable cathode materials for high voltage lithium batteries.

19 Claims, 5 Drawing Sheets

HIGH VOLTAGE INSERTION COMPOUNDS FOR LITHIUM BATTERIES

FIELD OF THE INVENTION

This invention pertains to lithium insertion compounds and the use thereof in lithium batteries. Specifically, it pertains to the use of certain lithium transition metal oxides as high voltage cathode materials in lithium batteries.

BACKGROUND OF THE INVENTION

Insertion compounds are those that act as a host solid for the reversible insertion of guest atoms. Such compounds, particularly lithium insertion compounds, have been extensively studied in recent years for purposes that include use as electrode materials in advanced high energy density batteries. A new type of rechargeable lithium battery, known as a lithium-ion battery, is a product based on lithium insertion compounds that has just become available commercially. These batteries have the greatest energy density (Wh/L) of presently available conventional rechargeable systems (ie. NiCd, NiMH, or lead acid batteries) and represent a preferred rechargeable power source for many consumer electronics applications. Additionally, lithium ion batteries operate around 3½ volts which is often sufficiently high such that a single cell can suffice for many electronics applications.

Lithium ion batteries use two different insertion compounds for the active cathode and anode materials. The excellent reversibility of lithium insertion makes such compounds function extremely well in rechargeable battery applications wherein thousands of battery cycles can be obtained. In a lithium ion battery, lithium is extracted from the anode material while lithium is concurrently inserted into the cathode on discharge of the battery. The reverse processes occur on recharge of the battery. Lithium atoms travel or "rock" from one electrode to the other as ions dissolved in a non-aqueous electrolyte with the associated electrons travelling in the circuit external to the battery.

The first commercial lithium ion batteries were 3.6 volt products based on $LiCoO_2$/pre-graphitic carbon electrochemistry from Sony Energy Tec. However, a wide range of carbonaceous compounds is suitable for use as the anode material, including coke (described in U.S. Pat. No. 4,702,977) and pure graphite (described in U.S. Pat. No. 4,423,125). Additionally, many other lithium transition metal oxide compounds are suitable for use as the cathode material, including $LiNiO_2$ (described in U.S. Pat. No. 4,302,518) and $LiMn_2O_4$ (described in U.S. Pat. No. 4,507,371). In the preceding, non-aqueous electrolytes are employed comprising $LiBF_4$ or $LiPF_6$ salts and solvent mixtures of ethylene carbonate, propylene carbonate, diethyl carbonate, and the like. Again, numerous options for the choice of salts and/or solvents in such batteries are known to exist in the art.

$LiMn_2O_4$ is a particularly attractive cathode material candidate because manganese is significantly cheaper than cobalt and/or nickel. $LiMn_2O_4$ refers to a stoichiometric lithium manganese oxide with a spinel crystal structure. This stoichiometric compound however has been found to exhibit undesirably poor cycle life when used as the cathode in lithium ion batteries of conventional construction. These cycle life problems have been overcome by varying the stoichiometry and methods of synthesis to some extent.

M. M. Thackeray et al. in U.S. Pat. No. 5,316,877 show a capacity versus cycle life improvement that results from incorporating additional lithium into the conventional stoichiometric spinel $LiMn_2O_4$. Therein, the compound was denoted as $Li_1D_{x/b}Mn_{2-x}O_{4+\delta}$. When D is Li, $\delta$ is 0 and the improved compound can be denoted $Li_{1/x}Mn_{2-x}O_4$, wherein $0 \leq x < 0.33$. Although it was suggested that other metals D could be incorporated with similar beneficial results, no mention was made therein regarding electrochemical behaviour of these compounds above 4.5 volts versus $Li/Li^+$. Actual electrochemical testing was restricted to voltages below 4.5 V versus $Li/Li^+$.

At the 11th International Seminar on Primary and Secondary Battery Technology and Application, Feb. 28–Mar. 3, 1994, Deerfield Beach, Fla., J. M. Tarascon confirmed the preceding result regarding capacity versus cycle life improvement by incorporating additional lithium into $LiMn_2O_4$. In this presentation, cyclic voltammograms also showed that both $LiMn_2O_4$ and compounds comprising additional lithium exhibit small capacity peaks at around 4.5 volts and 4.9 volts versus $Li/Li^+$. The small 4.5 V capacity decreased as the amount of additional lithium incorporated increased. On the other hand, the small 4.9 V capacity increased as the amount of additional lithium incorporated increased. It was noted that while some capacity was observed at voltages above 4.5 V and that this capacity increased with additional lithium content, this capacity was nonetheless extremely small. The useful capacity of the compound was obtained at voltages below 4.5 V and battery testing was confined to voltages below 4.5 V. In this presentation, no mention was made about nickel or chromium substituted compounds nor about the possibility of obtaining significant capacity at voltages above 4.5 V in such compounds.

In another article by the same author, J. M. Tarascon et al., J. Electrochem. Soc. Vol. 138, No. 10, (1991) 2859, the electrochemical properties of $LiMn_2O_4$ and various substituted compounds thereof were investigated. Included in the investigation were compounds $Li_xMn_{2-y}M_yO_4$ (which can also be denoted as $Li_xNi_zMn_{2-z}O_4$) wherein y ranged up to values of 0.4. However, no electrochemical testing was performed above 4.5 volts versus $Li/Li^+$. It was indicated therein that the lithium capacity of these nickel containing compounds decreases with increasing nickel content. Thus these nickel containing compounds appeared unattractive for battery applications.

Many substituted $LiMn_2O_4$ spinel insertion compounds have been reported in the art for application in lithium batteries. Much mention has been made of nickel and/or chromium substituted $LiMn_2O_4$ spinel insertion compounds. For example, in laid-open Japanese Patent Application No. 04-141954, Matsushita report on Ni and Cr substituted compounds wherein up to 0.2 moles of transition metal was substituted per molecule of $LiMn_2O_4$. Again, however, electrochemical testing was restricted to voltages below 4.5 V. In the Journal of Power Sources, 43–44 (1993) 539–546, W. Baochen et al. show that up to one chromium atom can be substituted for manganese in one mole of $LiMn_2O_4$. Again, electrochemical testing was performed at voltages only up to 3.8 V versus $Li/Li^+$. In U.S. Pat. No. 5,084,366, Y. Toyoguchi demonstrated that a cycling benefit could be obtained by appropriate chromium substitution. Again, electrochemical testing was performed only up to 4.5 V versus $Li/Li^+$.

Historically, difficulties with electrolyte stability has hindered the electrochemical evaluation of insertion compounds at relatively high voltages with respect to lithium. However, progress has been made in this area. U.S. Pat. No. 5,192,629, for instance, reveals a non-aqueous electrolyte suitable for use in a lithium ion battery comprising a $Li_{1+x}Mn_2O_4$ cathode that is oxidation resistant up to about 5 V.

With the availability of electrolytes that are stable at high voltage, lithium insertion compounds that deliver useable capacity at voltages above 4.5 V versus Li/Li$^+$ can not only be studied more easily but can also be considered for use in commercial battery applications. For instance, it was shown in Canadian Patent Application Serial No. 2,102,738 that a related group of lithium insertion compounds having an inverse spinel structure can unexpectedly exhibit substantial high voltage capacity that can be accessed at reasonable rate. These inverse spinel compounds may have similar stoichiometry to the aforementioned transition metal substituted LiMn$_2$O$_4$ compounds, but the crystal structure differs significantly from that of spinel.

It appears that the electrochemical properties of most substituted LiMn$_2$O$_4$ spinel compounds (including nickel and chromium substituted compounds) have not been determined above 4.5 V with respect to lithium despite the extensive research performed thereon to date. Thus, such compounds apparently have not been considered for use in lithium batteries operating in this high voltage range. Historical difficulties arising from a lack of stable high voltage electrolytes or previous negative capacity observations at lower voltages have tended to indicate that voltages above 4.5 V are not feasible.

SUMMARY OF THE INVENTION

We have discovered unexpectedly that there can be substantial useable reversible lithium capacity in certain transition metal substituted LiMn$_2$O$_4$ spinel insertion compounds above 4.5 volts versus Li/Li$^+$. For instance, we have found that the lithium capacity in Li$_x$Ni$_y$Mn$_{2-z}$O$_4$ apparently does not decrease with increasing Ni content but instead is realized at higher voltages (above 4.5 volts versus Li/Li$^+$) than in Li$_x$Mn$_2$O$_4$, a widely used material. Thus, instead of being a less preferred battery material from an energy density viewpoint, Li$_x$Ni$_y$Mn$_{2-z}$O$_4$ can actually be preferred as it offers the possibility of higher voltage batteries.

The invention in one embodiment thus comprises transition metal substituted, LiMn$_2$O$_4$ spinel, lithium insertion compounds that have useable reversible lithium capacity above 4.5 volts versus Li/Li$^+$. These lithium insertion compounds can be denoted as Li$_{x+y}$M$_z$Mn$_{2-y-z}$O$_4$. Therein, M represents the substituted transition metal and z is a number greater than zero and less than about 1. y is a number representing a relative 'shortage' of manganese and corresponding 'excess' amount of lithium and is greater than or equal to zero and less than 0.33. x is a number greater than or equal to zero and less than 1. The potential of the lithium insertion compound is greater than about 4.5 volts versus Li/Li$^+$. Lithium therefore can be reversibly inserted therein at potentials greater than about 4.5 volts versus Li/Li$^+$. The lithium insertion compounds do not necessarily have an ideal spinel crystal structure as a result of transition metal substitution and/or low lithium content. However, the crystal structure of the lithium insertion compound is similar to spinel (ie. spinel-like or distorted spinel).

In particular, M can be nickel for values of z up to about 0.5. When M is nickel, quite substantial amounts of lithium can be reversibly inserted above 4.5 V when z is greater than about 0.3. Alternately, M can be chromium. In this case, substantial amounts of lithium can be reversibly inserted when z is greater than about 0.5.

For improved cycle life in battery applications, it can be advantageous to employ insertion compounds of the invention having 'excess' lithium. The amount of 'excess' lithium, y, can be about 0.1.

In another embodiment, the invention includes a process for making insertion compounds of the invention. The process comprises extracting lithium from a precursor insertion compound having the formula Li$_{1+y}$M$_z$Mn$_{2-y-z}$O$_4$ and a spinel crystal structure. The extracting can be performed electrochemically.

The precursor insertion compound can be prepared by mixing reactant powders comprising electrolytic manganese dioxide, a transition metal source, and a lithium source in a stoichiometric manner; followed by heating the reactant powder mixture in an oxygen containing atmosphere. As a transition metal source, either nickel nitrate or nickel oxide and chromium sesquioxide can be used for nickel and chromium respectively. Either lithium hydroxide or lithium carbonate can be used as the lithium source. The heating can be performed between about 750 and 900 degrees C., and more than one mixing and heating step may be desirable.

Lithium batteries also form another embodiment of the invention. Generally, the lithium batteries comprise a lithium compound anode; an electrolyte comprising a solvent and a lithium salt; and a cathode comprising an insertion compound of the invention. Thus, put another way, the invention involves the use of such insertion compounds as a cathode in a lithium battery wherein a portion of the capacity of the battery is obtained at a cathode voltage greater than about 4.5 volts versus Li/Li$^+$. The batteries can be lithium ion types and can therefore have lithium compound anodes that are carbonaceous. The lithium salt can be LiBF$_4$ the solvent can comprise ethylene carbonate and diethyl carbonate. The solvent can additionally comprise ethyl methyl carbonate.

The cathode in the lithium battery can be easily formed by first constructing a battery with a precursor cathode comprising a precursor lithium insertion compound having the formula Li$_{1+y}$M$_z$Mn$_{2-y-z}$O$_4$ a spinel crystal structure. Thereafter, lithium is extracted electrochemically from the precursor cathode, thereby forming the high voltage insertion compound cathode.

BRIEF DESCRIPTION OF THE DRAWINGS

In drawings which illustrate specific embodiments of the invention, but which should not be construed as restricting the spirit or scope of the invention in any way.

DETAILED DESCRIPTION OF SPECIFIC EMBODIMENTS OF THE INVENTION $LiMn_2O_4$ has an ideal spinel structure of space group Fd3m with Li atoms in 8a sites, Mn atoms in 16d sites, and oxygen atoms in 32e sites (see the International Tables for X-ray Crystallography, Volume 1, The Kynoch Press, Birmingham, England, 1969). The $Li_{x+y}M_zMn_{2-y-z}O_4$ compounds of the invention can be derived from $LiMn_2O_4$ without substantial change of the crystal structure. However, as a result of substitution of transition metal M and Li along with a varied amount, x, of inserted lithium, there can be a mild distortion of the structure from that of the ideal spinel. Thus, the structure of the $Li_{x+y}M_zMn_{2-y-z}O_4$ compounds might be described as spinel-like. (Note that both the ideal spinel and spinel-like structures differ significantly from that of an inverse spinel type such as $LiNiVO_4$ wherein the oxygen atoms still reside in 32e sites, but the Li atoms and the Ni atoms randomly fill half the 16d sites each with the V atoms filling the 8a sites.)

In one respect, this invention comprises those insertion compounds that exhibit a useful amount of reversible lithium capacity at potentials greater than about 4.5 volts versus $Li/Li^+$. Certain transition metal substitutions, for instance chromium or nickel, can result in suitable insertion compounds. The amount z of substituted transition metal that can be accommodated can vary with the choice of transition metal. For instance, z can range up to 1 when chromium is chosen. However, it appears that nickel can only be substituted up to a value of 0.5. Generally, the greater the value of z, the greater the amount of reversible lithium capacity above 4.5 volts. When M is nickel and z is greater than about 0.3, the amount of capacity realized above 4.5 V is substantial. Similarly, when M is chromium and z is greater than about 0.5, the amount of capacity realized above 4.5 V is substantial.

As in the teachings of the prior art, an additional amount, y, of lithium can be substituted in these insertion compounds in order to improve cyclability in battery applications. y can range up to a value of 0.33 based on valence arguments. In the examples to follow, a preferred value for y was about 1.

These insertion compounds can be derived from suitable precursor insertion compounds $Li_{1+y}M_zMn_{2-y-z}O_4$ having a spinel crystal structure. These precursor insertion compounds are known in the art to reversibly insert lithium at voltages below 4.5 V versus $Li/Li^+$. Upon extracting Li from the precursor insertion compound, $Li_{x+y}M_zMn_{2-y-z}O_4$ compositions with x<1 are reached wherein lithium can be reversibly inserted above 4.5 V. The maximum value of x varies with the choice of transition metal M and the amount substituted therein, z.

The aforementioned precursor insertion compounds are conventional and can be prepared by appropriate heat treatment of suitable stoichiometric powder mixes in oxygen containing atmospheres. As shown in the examples to follow, suitable powder mixes can include electrolytic manganese dioxide (EMD) and lithium hydroxide or carbonate as sources of manganese and lithium respectively. As a source of the transition metal M, either nickel nitrate or oxide and chromium sesquioxide powder can be used for nickel and chromium respectively. Suitable heat treatment temperatures are typically in the range of about 750 to about 950 degrees C. The treatment atmosphere can be simply air or oxygen. Some effort (eg. multiple heating/mixing steps) is required to ensure uniform reaction in order to get a single phase product.

The extraction of lithium from the precursor insertion compound can be accomplished by chemical or electrochemical means. The latter method is preferred for conventional lithium ion battery applications and is performed in situ.

Generally, lithium batteries of the invention can be primary or secondary (rechargeable) and comprise the aforementioned insertion compounds as an electrode material. Various electrochemistries and battery configurations are possible. For instance, the batteries can have lithium metal, lithium alloy, and/or lithium insertion compound anodes. Various non-aqueous or aqueous electrolytes can be used. Product configurations include prismatic formats and miniature coin cells.

Figure 1:
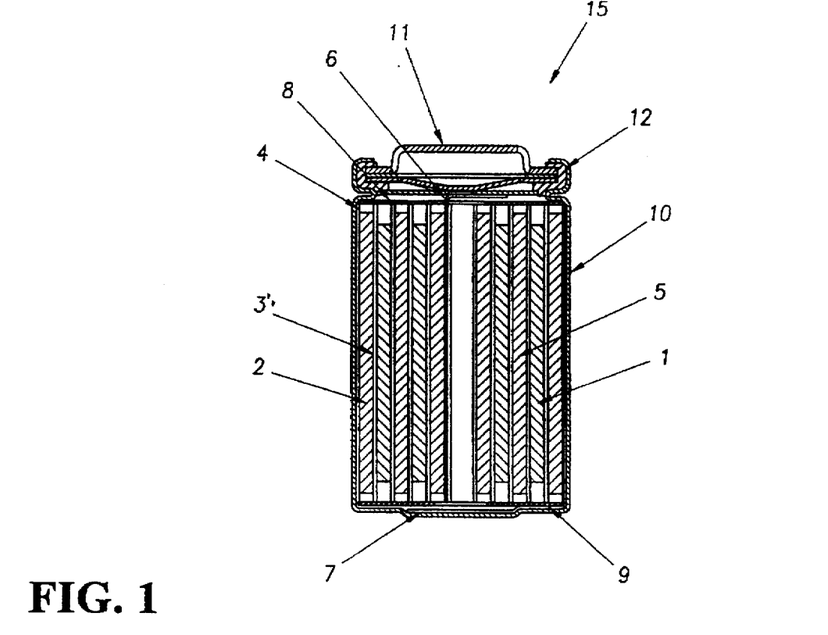
FIG. 1 depicts a cross-sectional view of a preferred embodiment of a cylindrical spiral-wound lithium ion battery.

A preferred construction for a lithium ion type battery is depicted in the cross-sectional view of a conventional spiral-wound battery in FIG. 1. A jelly roll 4 is created by spirally winding a cathode foil 1, an anode foil 2, and two microporous polyolefin sheets 3 that act as separators.

Cathode foils are prepared by applying a mixture of a powdered (about 10 micron size typically) precursor insertion compound, possibly other powdered cathode material if desired, a binder, and a conductive dilutant onto a thin aluminum foil. Typically, the application method first involves dissolving the binder in a suitable liquid carrier. Then, a slurry is prepared using this solution plus the other powdered solid components. The slurry is then coated uniformly onto the substrate foil. Afterwards, the carrier solvent is evaporated away. Often, both sides of the aluminum foil substrate are coated in this manner and subsequently the cathode foil is calendered.

Anode foils are prepared in a like manner except that a powdered (also typically about 10 micron size) carbonaceous insertion compound is used instead of the cathode material and thin copper foil is usually used instead of aluminum. Anode foils are typically slightly wider than the cathode foils in order to ensure that anode foil is always opposite cathode foil.

The jelly roll 4 is inserted into a conventional battery can 10. A header 11 and gasket 12 are used to seal the battery 15. The header may include safety devices if desired. A combination safety vent and pressure operated disconnect device may be employed. FIG. 1 shows one such combination that is described in detail in Canadian Patent Application No. 2,099,657. Additionally, a positive thermal coefficient device (PTC) may be incorporated into the header to limit the short circuit current capability of the battery. The external surface of the header 11 is used as the positive terminal, while the external surface of the can 10 serves as the negative terminal.

Appropriate cathode tab 6 and anode tab 7 connections are made to connect the internal electrodes to the external terminals. Appropriate insulating pieces 8 and 9 may be inserted to prevent the possibility of internal shorting. Prior to crimping the header 11 to the can 10 in order to seal the battery, a suitable non-aqueous electrolyte 5 is added to fill the porous spaces in the jelly roll 4.

The battery as constructed is in a fully discharged state. Upon charging, lithium is extracted from the cathode and inserted into the anode. The initial charging thus serves to form the high voltage insertion compound in situ.

Those skilled in the art will understand that the types of and amounts of the component materials must be chosen based on component material properties and the desired performance and safety requirements. The use of a higher voltage cathode material poses additional requirements over those of commercially available lithium ion batteries. Obviously, the electrolyte chosen must have a greater voltage stability window (in order to be stable at higher cathode potentials). Additionally, the hardware employed at cathode potential must also be stable at these higher voltages.

In the aforementioned J. Electrochem. Soc. article by J. M. Tarascon et al., it appeared that the reversible lithium capacity of $Li_xNi_zMn_{2-z}O_4$ decreased with increasing nickel content. However, as illustrated in the examples to follow, it appears that this lithium capacity is not 'lost' or made unavailable, with increasing nickel content. Instead, it is unexpectedly realized at somewhat higher voltages. At this time, the physical reasons for the apparent voltage 'shift' of part of the lithium capacity are unclear. Additionally, it is unknown what the crystal structures are precisely and hence where the lithium atoms are exactly. However, similar behaviour is not unexpected for transition metals other than nickel and chromium.

The following Examples are provided to illustrate certain aspects of the invention but should not be construed as limiting in any way. Therein, laboratory coin cell batteries were used to determine electrochemical characteristics of the high voltage insertion compounds against a lithium metal anode. These coin cell batteries were assembled using conventional 2350 hardware in a dry room but otherwise as described in J. R. Dahn et al, Electrochimica Acta, 38, 1179 (1993). A stainless steel cap and special oxidation resistant case comprise the container and also serve as negative and positive terminals respectively. A gasket was used as a seal which also served to separate the two terminals. Mechanical pressure was applied to a stack comprising a lithium anode, separator, and cathode by means of mild steel disc spring and stainless disc. The disc spring was selected such that a pressure of about 15 bar was applied following closure of the battery. 125 μm thick metal foil was used as a lithium anode. Celgard 2502 microporous polypropylene film was used as the separator. Except where indicated, the electrolyte was a solution of 1.5M $LiBF_4$ salt dissolved in a solvent mixture of EC and DEC in a volume ratio of 30/70 respectively.

Cathodes were made by uniformly coating a 20 μm thick aluminum foil substrate with a blend containing a mixture of insertion compound powder, Super S (product of Ensagri) carbon black conductive dilutant, and ethylene propylene diene monomer (EPDM) binder. This was accomplished by initially making a slurry containing cyclohexane solvent wherein the insertion compound powder and carbon black mixture (88 and 10 parts by weight respectively) were added to an appropriate amount of binder solution containing 4% EPDM in cyclohexane, such that 2% of the final dried electrode mass would be EPDM. Excess cyclohexane was then added until the slurry viscosity was like that of a syrup, whereupon the slurry was then coated onto the foil using a doctor blade spreader. Cyclohexane was then evaporated away at room temperature in air, leaving a deposited coating about 12 mg/cm² in weight. After drying, the electrode was compacted between flat plates at about 25 bar pressure. A disc cathode of diameter 16.2 mm was then cut from this larger electrode using a precision cutting jig. The weight of the coating was typically about 12 The cathode was then weighed and the active insertion compound mass present was obtained by subtracting the weight of Al foil, EPDM, and carbon black present.

Coin cell batteries were thermostatted at 21±1° C. before testing and were then charged and discharged using constant current cyclers with ±1% current stability. Current densities were adjusted to be equivalent to C/40 rate unless indicated otherwise. Data was logged whenever the cell voltage changed by more than 0.001 V.

INVENTIVE EXAMPLE 1

A series of precursor insertion compounds $Li_1Ni_zMn_{2-z}O_4$ with z amounts of 0.05, 0.1, 0.2, 0.3, ; and 0.5 respectively was synthesized using mixtures of EMD ($LiMnO_2$—TAD 1 grade from Mitsui), $(NiNO_3).6H_2O$, and LiOH powders in appropriate amounts. To get a homogeneous reaction product for samples with z amounts ≦0.3, the mixtures were heat treated first at 750° C. in air for 4 hours. The product was ground and mixed again followed by a second similar heat treatment for an additional 12 hours. For the sample with z=0.4, the synthesis was similar except that the second heat treatment lasted 24 hours. For the sample with z=0.5, the first heat treatment lasted 16 hours and the second heat treatment was performed at 850° C. for 12 hours.

Figure 2:
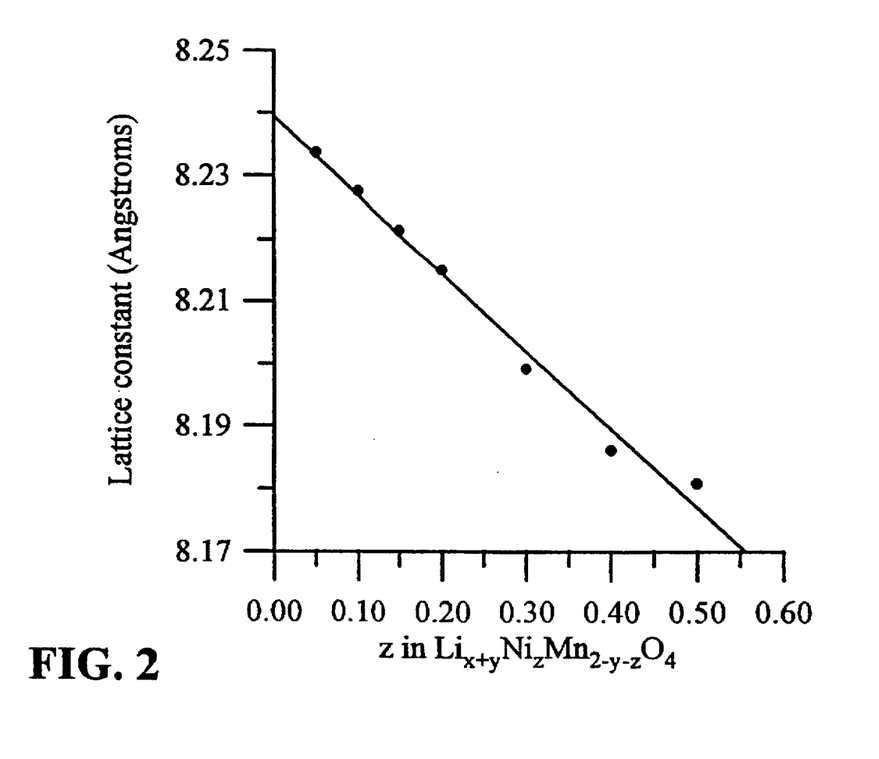
FIG. 2 shows the relationship between the lattice constant of the samples in the series of Inventive Example 1 versus nickel content.

The precursor insertion compounds all had a spinel crystal structure with the Ni mainly occupying 16d positions. The lattice constant of the samples in the series decreases with increasing nickel content as shown in FIG. 2.

Figure 3:
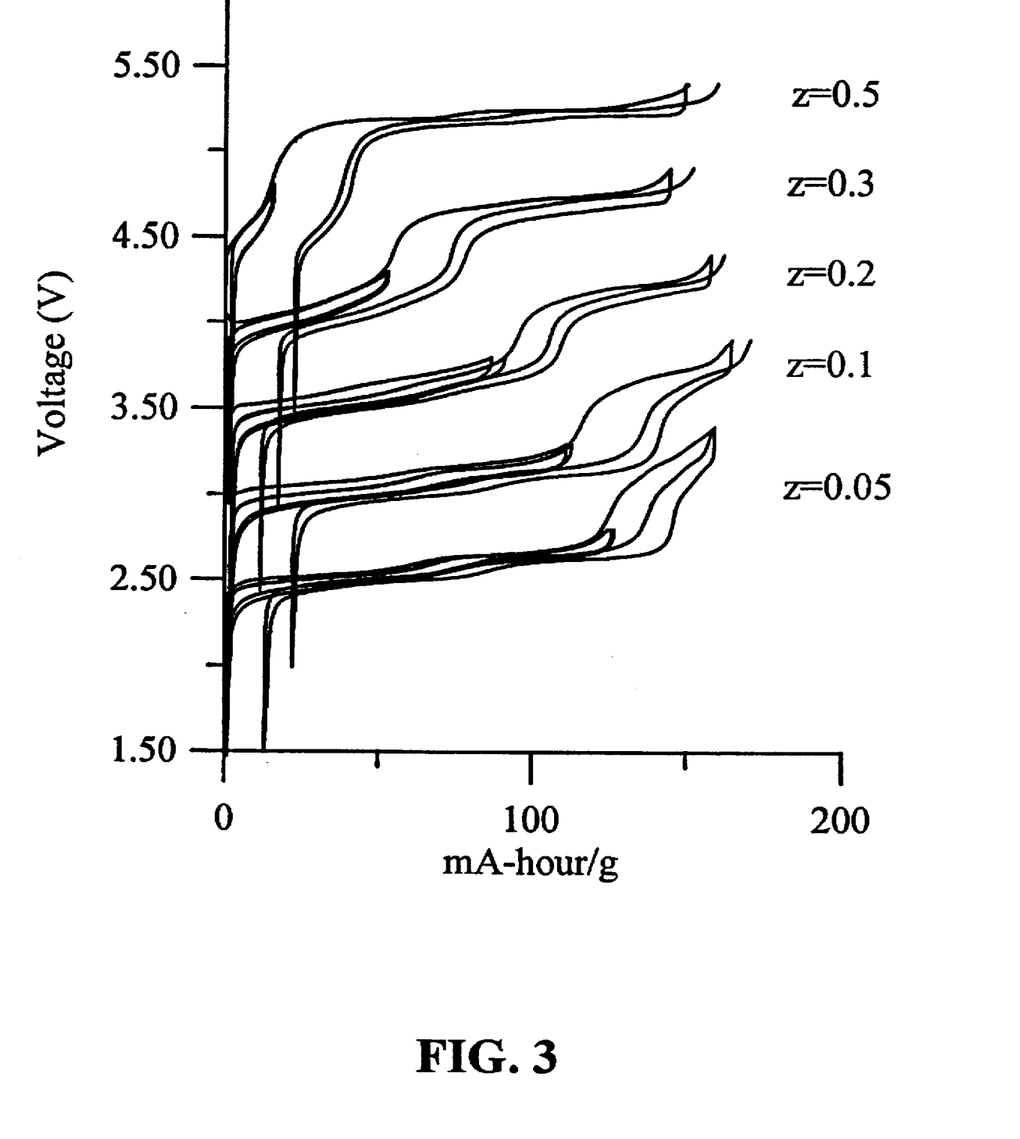
FIG. 3 shows the voltage plotted against capacity per gram of precursor insertion compound for the batteries of the series of Inventive Example 1. The voltage curves have been offset for clarity. For the batteries comprising the z=0.5, 0.3, 0.2, 0.1, and 0.05 samples, the curves are offset by +0.5, 0, −0.5, −1, and −1.5 volts respectively.

A series of laboratory coin cell batteries was constructed as described in the preceding using these precursor insertion compounds as cathodes. Each battery was then charged to 4.9 volts, thereby extracting lithium from the cathode, and then cycled a few times. FIG. 3 shows the battery voltage (insertion compound versus lithium) plotted against capacity per gram of precursor insertion compound for each battery of the series. The voltage curves have been offset for clarity. For the batteries comprising the z=0.5, 0.3, 0.2, 0.1, and 0.05 samples, the curves are offset by +0.5, 0, −0.5, −1, and −1.5 volts respectively.

A significant reversible lithium capacity between about 4.5 and 4.9 volts (on a rough plateau at an average 4.7 volts) is observed even for z values as low as 0.05. With increasing z, the reversible lithium capacity at high voltage increases. For z values of 0.3 and up, this capacity becomes quite substantial and exceeds the reversible capacity below 4.5 volts. In each case however, the total reversible capacity between the starting composition and that at 4.9 volts is roughly the same, around 125 mAh/g. (This is also roughly the same as the reversible extractable lithium capacity for $LiMn_2O_4$ spinel.) Thus, the presence of the substituted nickel seems to 'shift' a portion of the voltage curve above 4.5 volts.

Figure 4:
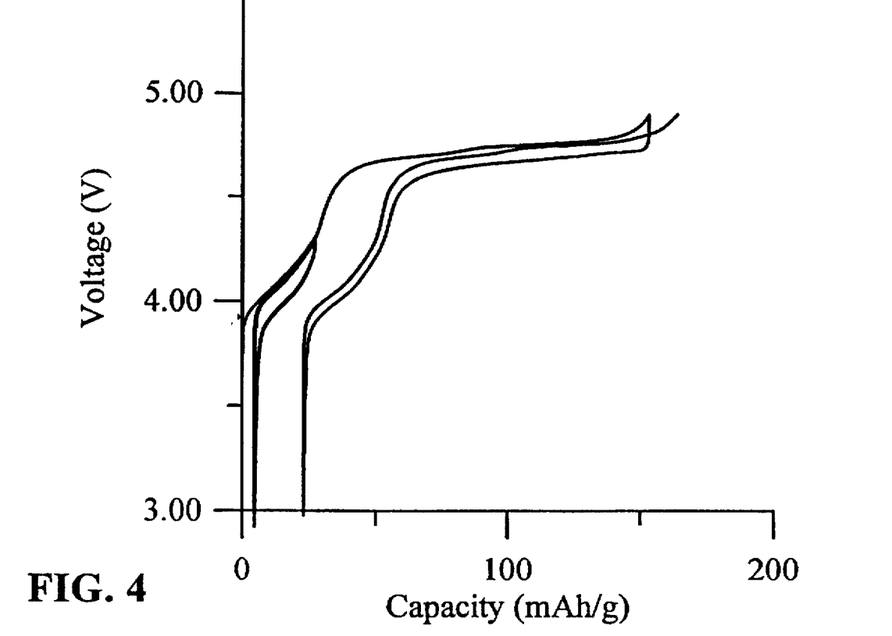
FIG. 4 shows the voltage plotted against capacity per gram of Li$_1$Ni$_{0.4}$Mn$_{1.6}$O$_4$ cathode for the battery of Inventive Example 1 comprising 1.5M LiBF$_4$/ethylene carbonate (EC)-diethyl carbonate (DEC)-ethyl methyl carbonate (EMC) electrolyte.

Another coin cell battery was made with cathode comprising $Li_1Ni_{0.4}Mn_{1.6}O_4$ from the above series but with an electrolyte comprising 1.5M $LiBF_4$ salt in a solvent mixture of EC, DEC, and EMC in a volume ratio of 20/30/50 respectively. FIG. 4 shows the voltage plotted against capacity per gram of precursor insertion compound for this battery. The results are similar to that of the corresponding battery in FIG. 1.

Figure 5:
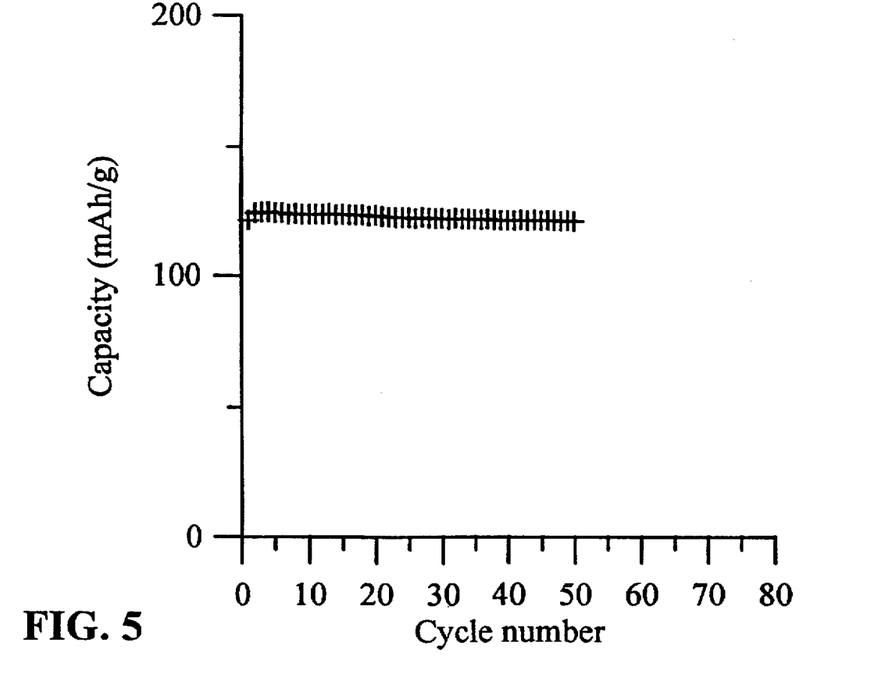
FIG. 5 shows the capacity versus cycle number for the Li$_1$Ni$_{0.4}$Mn$_{1.6}$O$_4$ battery that was cycled over 50 times in Inventive Example 1

Another coin cell battery was made with cathode comprising $Li_1Ni_{0.4}Mn_{1.6}O_4$ similar to the above series and cycled between 3.0 and 4.9 volts at 21° C. at a C/10 rate charge and C rate discharge. FIG. 5 shows the capacity versus cycle number for this battery. Little capacity loss is seen over 50 cycles.

INVENTIVE EXAMPLE 2

A precursor insertion compound $Li_{1.1}Ni_{0.5}Mn_{1.4}O_4$ was synthesized in the following manner. First, $LiMn_2O_4$ was prepared by heat treating an appropriate mixture of EMD ($LiMnO_2$—TAD 1 grade from Mitsui) and $Li_2CO_3$ powders at 900° C. in air for 20 hours. Additional $Li_2CO_3$ and NiO powders were then mixed in with the $LiMn_2O_4$ product followed by heat treatment in air at 900° C. for 20 hours. Finally, this product was ground, remixed, and heat treated for an additional 12 hours at 850° C. in oxygen.

Figure 6A:
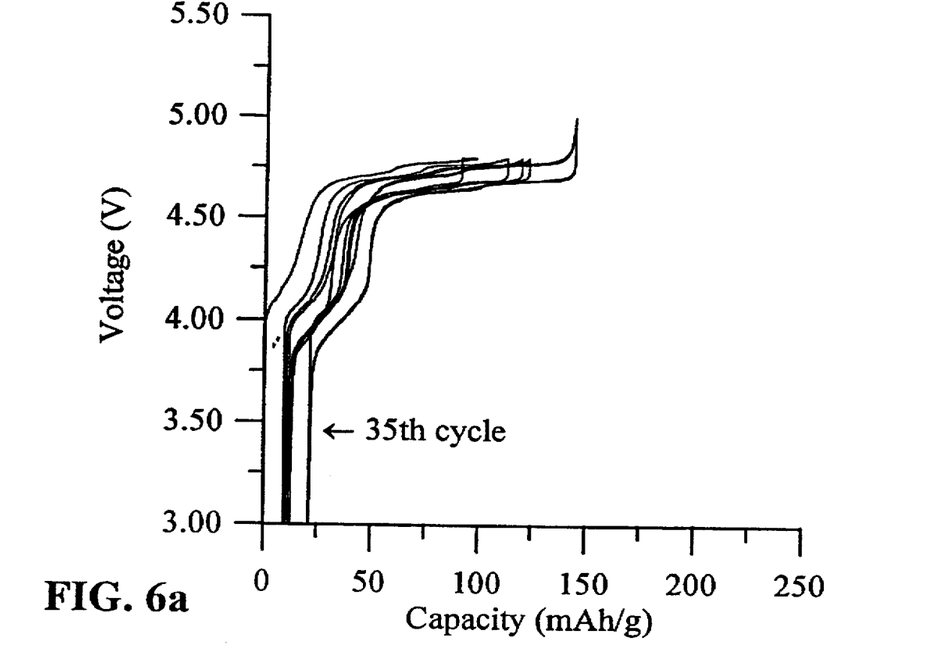
FIGS. 6a and b compare the voltage versus capacity per gram of precursor insertion compound of the battery comprising the $Li_{1.1}Ni_{0.5}Mn_{1.4}O_4$ sample in Inventive Example 2 to that of another battery comprising the $Li_1Ni_{0.5}Mn_{1.5}O_4$ sample in inventive Example 1 respectively.
Figure 6B:
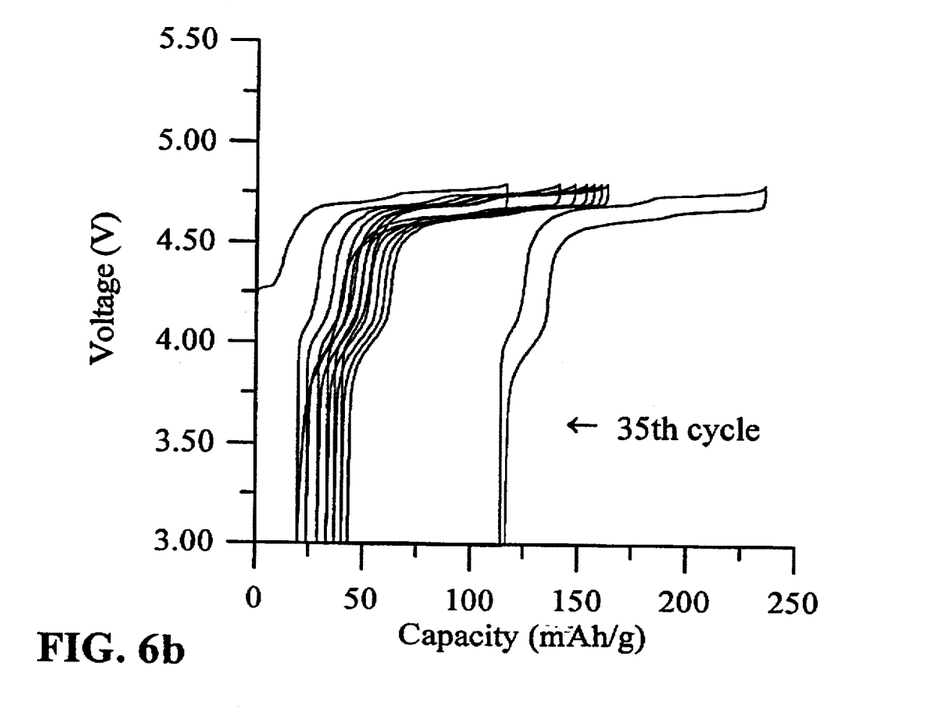

A laboratory coin cell battery was constructed as described in the preceding using this precursor insertion compound as the cathode. The battery was then charged to 4.8 volts, thereby extracting lithium from the cathode, and then cycled a few times. FIGS. 6a and b compare the voltage versus capacity per gram of precursor insertion compound of this battery to that of another similarly cycled battery comprising the $Li_1Ni_{0.5}Mn_{1.5}O_4$ sample in Inventive Example 1 respectively.

The voltage curves are similar except that the $Li_1Ni_{0.5}Mn_{1.5}O_4$ sample (wherein y=0) has a larger recharge capacity than discharge capacity. Consequently, the curve shifts to the right in this plot with each cycle. The larger recharge capacity is indicative of an irreversible decomposition or degradation process, possibly of the electrolyte or cathode material. The voltage curve of the $Li_{1.1}Ni_{0.5}Mn_{1.4}O_4$ sample shows significantly better results.

INVENTIVE EXAMPLE 3

A precursor insertion compound $Li_1Cr_{0.5}Mn_{1.5}O_4$ was synthesized using an appropriate mixture of EMD, $Cr_2O_3$, and LiOH powders. The mixture was heat treated in air at 800° C. for 4 hours, ground, remixed, and heat treated again at 900° C. for 11 hours.

Figure 7:
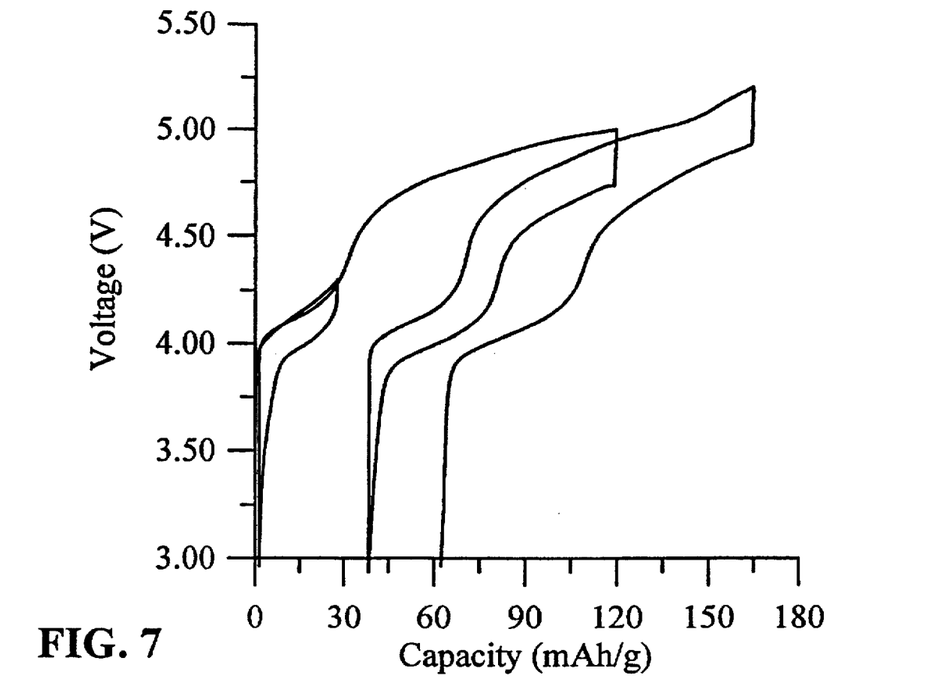
FIG. 7 shows the voltage versus capacity per gram of $Li_1Cr_{0.5}Mn_{1.5}O_4$ for the battery of Inventive Example 3.

A laboratory coin cell battery was constructed as described in the preceding using this precursor insertion compound as the cathode. The battery was then charged, thereby extracting lithium from the cathode, and then cycled a few times. FIG. 7 shows the voltage versus capacity per gram of precursor insertion compound for this battery. There is substantial reversible lithium capacity between about 4.8 and 5.2 volts. However, there is also significant shifting of the voltage curve with each cycle, perhaps indicative of more severe electrolyte decomposition at these higher voltages.

The preceding Examples show that $Li_{x+y}M_zMn_{2-y-z}O_4$ compounds can exhibit substantial useful reversible lithium capacity above 4.5 volts versus lithium when M is nickel or chromium. Additionally, cycling characteristics can be improved when y>0.

ILLUSTRATIVE EXAMPLE 1

An attempt was made to synthesize precursor insertion compound $Li_{1.1}Ni_{0.5}Mn_{1.4}O_4$ from an appropriate mixture of EMD, NiO, and $Li_2CO_3$ powders but otherwise as in Inventive Example 2. The mixture was first heat treated in air at 900° C. for 20 hours. Then, the product was ground, remixed, and heat treated for an additional 12 hours at 850° C. in oxygen. The result was a mixture of the phases NiO, $Li_2MnO_3$ and a $Li_{1+y}Ni_zMn_{2-y-z}O_4$ compound. The preparation of relatively pure precursor insertion compounds is not always straightforward.

ILLUSTRATIVE EXAMPLE 2

Figure 8:
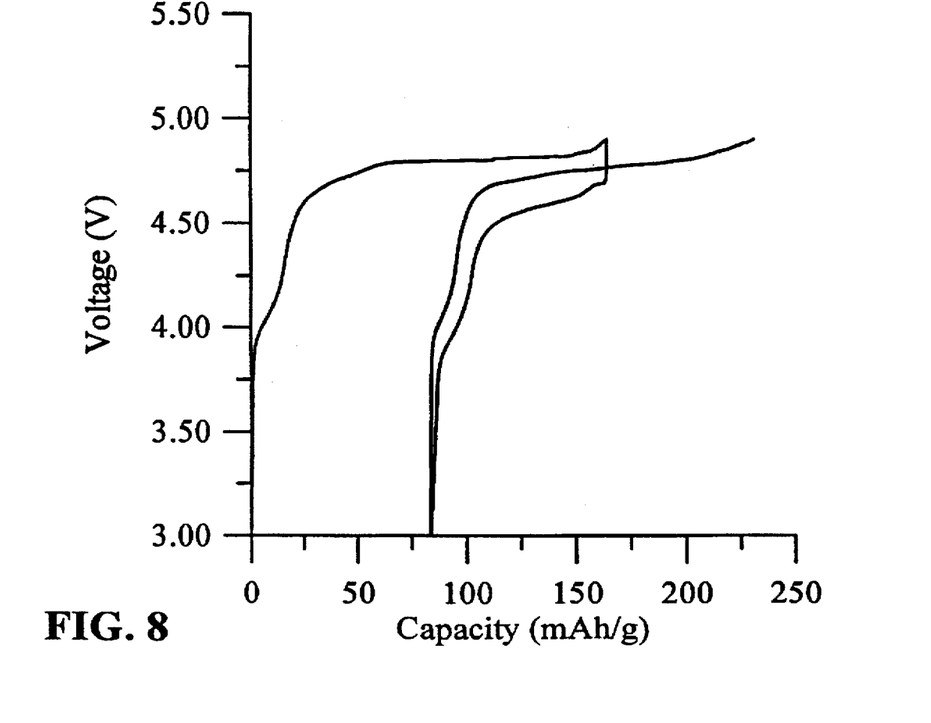
FIG. 8 shows the voltage plotted against capacity per gram of precursor insertion compound for the battery of Illustrative Example 2.

A laboratory coin cell battery was constructed as described in the preceding with cathode comprising $Li_1Ni_{0.5}Mn_{1.5}O_4$ insertion compound from the series of Inventive Example 1 and an electrolyte comprising 1.2M $LiPF_6$ salt in a solvent mixture of EC, DEC, and EMC in a volume ratio of 20/30/50 respectively. The battery was then charged to 4.9 volts, thereby extracting lithium from the cathode, and then cycled once. FIG. 8 shows the voltage plotted against capacity per gram of precursor insertion compound for this battery. An enormous recharge capacity is observed suggesting that this electrolyte is unsuitable for use in this situation. With the exception of the salt employed, this battery is similar to that of FIG. 4. $LiPF_6$ salt thus appears unsuitable for use in this situation.

As will be apparent to those skilled in the art in the light of the foregoing disclosure, many alterations and modifications are possible in the practice of this invention without departing from the spirit or scope thereof. For example, it may be possible to synthesize precursor insertion compounds comprising hydrogen instead of lithium. If the hydrogen is removed thereafter by heating or the like, a high voltage insertion compound of the invention might be synthesized, ready for use in a primary battery application, all in the absence of lithium. Accordingly, the scope of the invention is to be construed in accordance with the substance defined by the following claims.

What is claimed is:

1. A lithium insertion compound having the formula $Li_{x+y}M_zMn_{2-y-z}O_4$ wherein the insertion compound has a spinel-like crystal structure, M is a transition metal, x is a number greater than or equal to zero and less than 1, y is a number greater than or equal to zero and less than 0.33, z is a number greater than zero and less than about 1, and the potential of the lithium insertion compound is greater than about 4.5 volts versus $Li/Li^+$.

2. An insertion compound as claimed in claim 1 wherein M is nickel.

3. An insertion compound as claimed in claim 2 wherein z is less than about 0.5.

4. An insertion compound as claimed in claim 3 wherein z is greater than about 0.3.

5. An insertion compound as claimed in claim 1 wherein M is chromium.

6. An insertion compound as claimed in claim 5 wherein z is greater than about 0.5.

7. An insertion compound as claimed in claim 1 wherein y is about 0.1.

8. A lithium battery comprising a lithium compound anode; an electrolyte comprising a solvent and a lithium salt; and a cathode comprising a lithium insertion compound having the formula $Li_{x+y}M_zMn_{2-y-z}O_4$ wherein the lithium insertion compound has a spinel-like crystal structure, M is a transition metal, x is a number greater than or equal to zero and less than 1, y is a number greater than or equal to zero and less than 0.33, z is a number greater than zero and less than about 1, and the potential of the lithium insertion compound is greater than about 4.5 volts versus $Li/Li^+$.

9. A lithium battery as claimed in claim 8 wherein the lithium compound anode is carbonaceous.

10. A lithium battery as claimed in claim 8 wherein the lithium salt is $LiBF_4$.

11. A lithium battery as claimed in claim 8 wherein the solvent comprises ethylene carbonate and diethyl carbonate.

12. A lithium battery as claimed in claim 11 wherein the solvent additionally comprises ethyl methyl carbonate.

13. A lithium battery as claimed in claim 8 wherein M is nickel.

14. A lithium battery as claimed in claim 13 wherein z is less than about 0.5.

15. A lithium battery as claimed in claim 13 wherein z is greater than about 0.3.

16. A lithium battery as claimed in claim 8 wherein M is chromium.

17. A lithium battery as claimed in claim 16 wherein z is greater than about 0.5.

18. A lithium battery as claimed in claim 8 wherein y is about 0.1.

19. A lithium battery as claimed in claim 8 wherein the cathode is formed in the battery by extracting lithium electrochemically from a precursor cathode comprising a precursor insertion compound, the precursor insertion compound having the formula $Li_{1+y}M_zMn_{2-y-z}O_4$ a spinel crystal structure.

* * * * *

UNITED STATES PATENT AND TRADEMARK OFFICE
CERTIFICATE OF CORRECTION

PATENT NO. : 5,631,104
DATED : May 20, 1997
INVENTOR(S) : Zhong et al.

It is certified that error appears in the above-indentified patent and that said Letters Patent is hereby corrected as shown below:

Column 8, line 13, after "0.3," and before "and" delete --;--.

Column 12, line 9, "$Li_{1+y}M_zMn_{2-y-z}O_4$ a spinel crystal" should read --$Li_{1+y}M_zMn_{2-y-z}O_4$ and a spinel crystal--.

Signed and Sealed this

Fifth Day of August, 1997

Attest:

BRUCE LEHMAN

*Attesting Officer*  *Commissioner of Patents and Trademarks*